(12) United States Patent
Ruef et al.

(10) Patent No.: US 8,457,018 B1
(45) Date of Patent: Jun. 4, 2013

(54) MERKLE TREE REFERENCE COUNTS

(75) Inventors: Richard Ruef, Livermore, CA (US); Kurt Everson, Missouri City, TX (US); Nickolay Dalmatov, Saint-Petersburg (RU); William Carl Biester, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 242 days.

(21) Appl. No.: 12/459,473

(22) Filed: Jun. 30, 2009

(51) Int. Cl.
*G06F 17/30* (2006.01)

(52) U.S. Cl.
USPC .......................................... 370/256; 370/400

(58) Field of Classification Search
USPC .................................................. 370/256, 400
See application file for complete search history.

(56) References Cited

U.S. PATENT DOCUMENTS

| | | | | |
|---|---|---|---|---|
| 6,633,579 B1 * | 10/2003 | Tedijanto et al. | ............. | 370/432 |
| 6,662,184 B1 * | 12/2003 | Friedberg | ...................... | 707/754 |
| 7,023,811 B2 * | 4/2006 | Pinto | .............................. | 370/254 |
| 7,187,676 B2 * | 3/2007 | DiMambro | .................... | 370/392 |
| 7,827,114 B2 * | 11/2010 | Pinkas et al. | ...................... | 705/75 |
| 2002/0087564 A1 * | 7/2002 | Khanna et al. | ................. | 707/100 |
| 2003/0028517 A1 * | 2/2003 | Nakano et al. | ..................... | 707/1 |
| 2003/0083049 A1 * | 5/2003 | Matthews | ...................... | 455/414 |
| 2006/0013263 A1 * | 1/2006 | Fellman | ......................... | 370/503 |
| 2008/0228790 A1 * | 9/2008 | Smith et al. | .................... | 707/100 |

OTHER PUBLICATIONS

Bart Preneel, "Cryptographic Hash Functions", 1993.*

* cited by examiner

*Primary Examiner* — Kim Nguyen
(74) *Attorney, Agent, or Firm* — Theodore A. Chen; Krishnendu Gupta

(57) ABSTRACT

A method, article of manufacture, and apparatus for managing data commonality in a Merkle tree is disclosed. Reference counts are associated with a node in the Merkle tree. Data commonality is detected and the root of the detected data commonality is determined. If a node is the root node of the detected data commonality, the nodes reference count is incremented. When an object is deleted, the root node of the object is determined. The reference count of the node is decremented. If the count reaches zero, the node is removed from the Merkle tree, and its child nodes are decremented.

2 Claims, 7 Drawing Sheets

MERKLE TREE REFERENCE COUNTS

CROSS-REFERENCE TO RELATED APPLICATIONS

This application is related to co-pending U.S. patent application Ser. No. 12/459,479 for VOLATILE DEDUPLICATED INDICES and filed concurrently herewith, which is incorporated herein by reference for all purposes and co-pending U.S. patent application Ser. No. 12/459,467 for ACCESSING DATA WITH AN INCOMPLETE INDEX and filed concurrently herewith, which is incorporated herein by reference for all purposes.

FIELD OF THE INVENTION

The present invention relates generally to data systems, and more particularly, to systems and methods of efficiently reading and writing data.

BACKGROUND OF THE INVENTION

A conventional approach to efficiently store information is deduplication. Deduplication removes the redundancy commonly found in all types of data. Examples of such redundancy include multiple copies of the same file in a storage device. By storing only a single instance of the file and using pointers to reference that single instance, deduplication helps to reduce the amount of storage capacity consumed by data.

The pointers are typically stored in an index. Unfortunately, if the index containing those pointers is lost or altered, all of the data pointed to becomes inaccessible. Further, if the index is large, it may require considerable resources to search through the index to find deduplicated data. There is a need, therefore, for an improved method, article of manufacture, and apparatus for storing information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
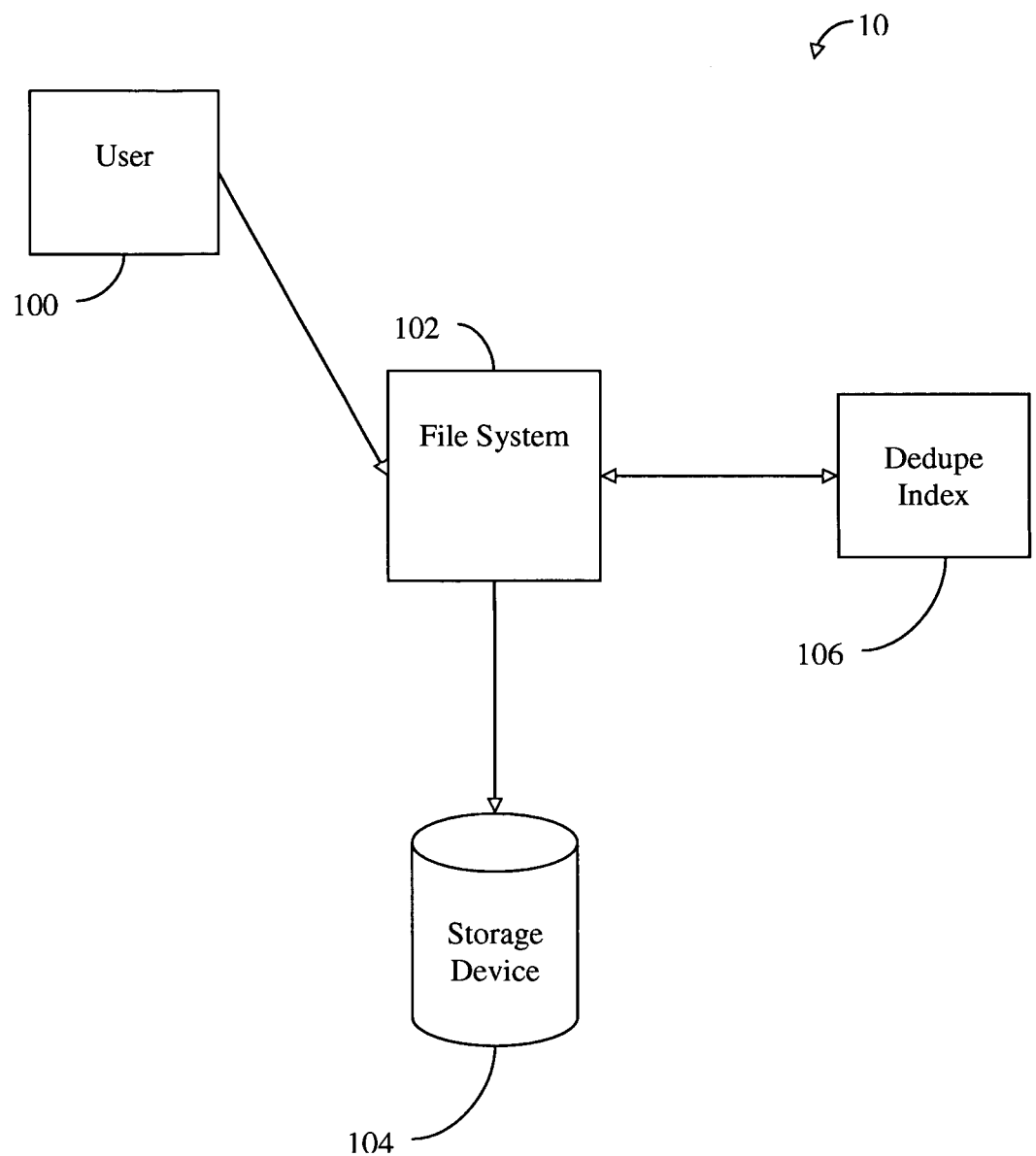
FIG. 1 is a diagram of a prior art system.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently store information. To improve a system's performance deduplication may be used. Deduped data is conventionally accessible via an index which maps data commonality along with data location.

FIG. 1 illustrates a conventional dedupe system 10 having a User 100, a File System 02, Storage Device 104, and Dedupe Index 106. User 100 gives input and output operations (I/O) to File System 102. I/O may also be referred to as reading and writing data. File System 102 looks up Dedupe Index 106 to know where data is in Storage Device 104, and how to write data to Storage Device 104.

Conventionally, all data commonality is mapped in a dedupe index. The data location is also mapped in the dedupe index, so the dedupe index is necessary to read data from the system. This requires the dedupe index to always be present and available which leads to scalability and performance issues in systems with limited resources. For example, if a user simply wished to access one small file in a very large system with a correspondingly large dedupe index, considerable processing power would be required in order to scan the dedupe index within a reasonable amount of time.

Deduplicated data, by its nature, is extremely fragmented. Typical methods of deduplicating data include applying a hash function to the data to create signatures, and storing the signatures in a hash index. Unfortunately, due to the nature of deduplicated data, the index is perfectly distributed. This means that in order to locate a specific signature in the index, a user would have to search the entire index. The user cannot narrow the search since a signature has an equal probability of being anywhere in the index. As the index grows larger, searching it requires more processing resources.

Further, if a dedupe index was damaged, lost, or otherwise altered, there would have no way of knowing where data was stored.

Figure 2:
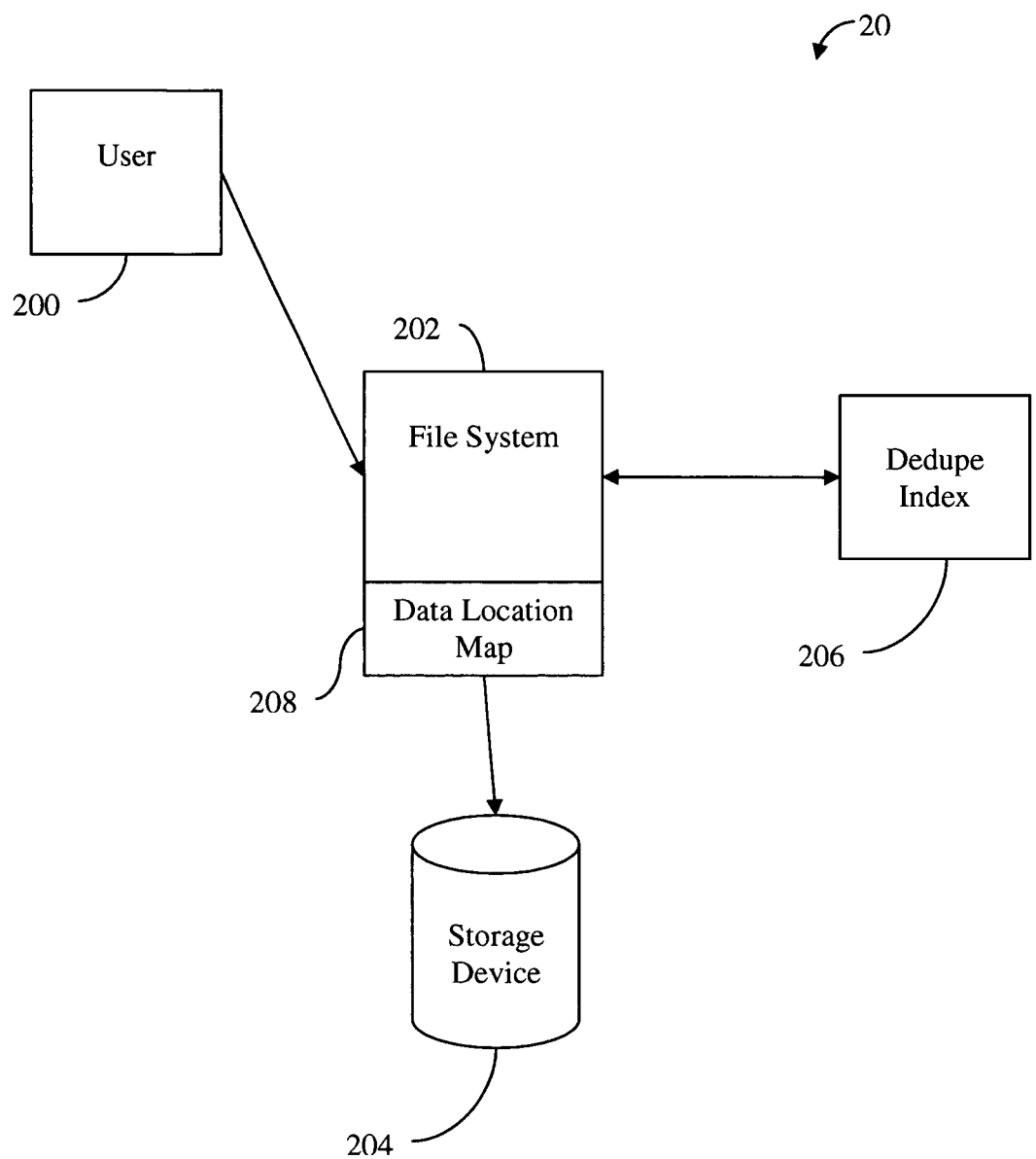
FIG. 2 is a diagram of an embodiment of a system in accordance with the invention.

The techniques described herein addresses these issues. FIG. 2 illustrates an embodiment of the current invention. Dedupe System 20 has a User 200, File System 202, Storage Device 204, Dedupe Index 206, and Data Location Map 208. User 20 gives I/O operations to File System 202. File System 202 looks up Dedupe Index 206 only for mapping data commonality. Dedupe Index 206 contains only information about data commonality, not the data location. Data Location Map 208 contains the location of the data stored in Storage Device 204, and is part of File System 202. By having Data Location Map 208, File System 202 now has all it needs to read data stored in Storage Device 204.

Though FIG. 2 illustrates only one user and one storage device, the techniques described herein are equally applicable to more complex systems. Multiple users may access multiple storage devices via multiple file systems. Multiple dedupe algorithms may be utilized, generating multiple dedupe indices.

Data location maps may reside in one machine, and dedupe indices may reside in another machine. Unlike dedupe indices, which are perfectly distributed, data location maps have information which in assist in searching for the location of deduplicated data. In some embodiments, data location maps may contain clues, or other helpful information about the location. In some embodiments, data location maps may contain the actual location. In some embodiments, data location maps may index the actual blocks of the deduplicated data, instead of referencing a signature, to quickly locate the block (e.g. not search the entire data location map to locate a specific block). In some embodiments, the data location map may be used with the Linux operating system to quickly identify blocks. Data location maps may use offsets to locate deduplicated data in some embodiments.

Further, though described in terms of a file system, the techniques described herein are equally applicable in other types of systems capable of storing representing data. Such systems may include object systems, among others.

The ability to read data independent of an index provides many benefits. One benefit is the ability to access stored data regardless of the state of the dedupe index. This allows for indices to be volatile without impacting data accessibility.

Another benefit is the ability to update or change the deduplication algorithm without impacting data accessibility. There are currently several, dedupe algorithms, and each algorithm has its own corresponding index. It may be difficult to change a system from one dedupe algorithm to another since changing dedupe algorithms requires changing the dedupe index. As discussed herein, changing or altering the dedupe index in conventional systems may result in inaccessible data. Using the techniques described herein, changing the dedupe index does not impact data accessibility. The data location map identifies where the data is, so legacy data accessibility will not be impacted by upgrading to a more efficient dedupe algorithm. This allows for great flexibility in changing dedupe behavior.

Yet another benefit is the ability to utilize incomplete dedupe indices. Conventionally, if any part of the dedupe index was lost, the entire data would be unreadable. In accordance with the techniques disclosed herein, all the data remains readable if some or all of the dedupe index was lost.

In some embodiments, a system may be designed that does not completely map all data commonality in a dedupe index. This may be preferable when resources are limited. For example, mapping 90% of a deduped datastream may require X amount of resources. If mapping 100% of the deduped datastream required 2× amount of resources, it may not be efficient to map the entire dedupe datastream. If only a subset of commonality is to be mapped, then the level of deduplication is limited to the entries actually mapped within the dedupe index. The entire datastream is still divided into blocks, and the blocks will have their location stored in a data location map within the file system.

Figure 4:
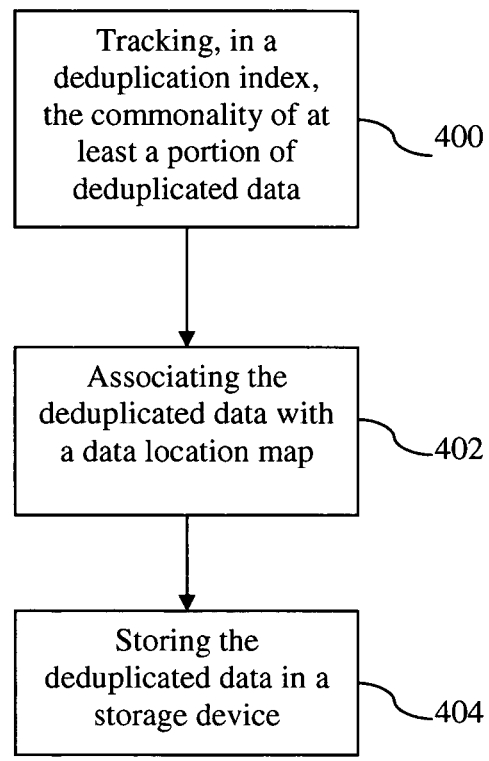
FIG. 4 is a flowchart illustrating a process in accordance with some embodiments.

FIG. 4 is a flowchart illustrating a process in accordance with the techniques described herein. In step 400, at least a portion of deduplicated data is mapped in an index. In step 402, the deduplicated data is associated with a data location map. In step 404, the deduplicated data is stored in a storage device.

Figure 5:
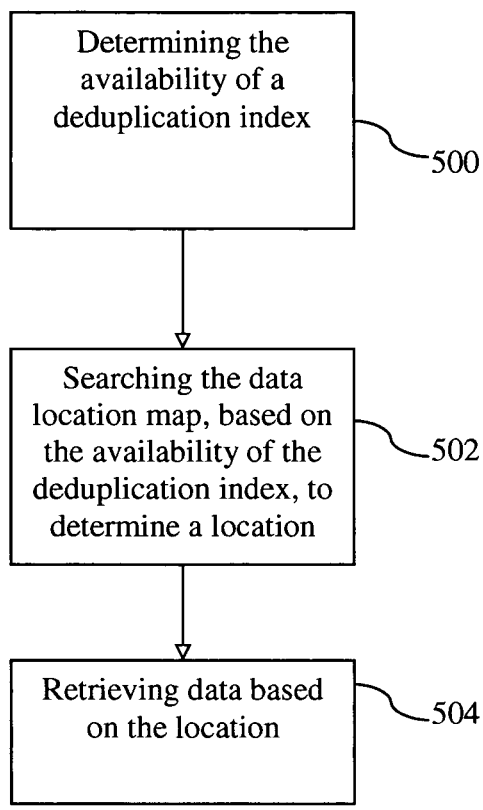
FIG. 5 is a flowchart illustrating a process to access data in accordance with some embodiments.

FIG. 5 is a flowchart illustrating a process to access data in accordance with the techniques described herein. In step 500, the availability of a deduplication index is determined. In step 502, the data location map is searched based on the availability of the deduplication index to determine a location. In step 504, data is retrieved based on the location.

Files may also be mapped to the dedupe index according to policy. In some embodiments, a policy may be used to map certain file types to the dedupe index while excluding other file types.

Retrieving data with the techniques described herein may be more efficient since the index does not need to be accessed to find the location of the data. Further, storing data with the techniques described herein may be more efficient since the index can also be bypassed (based on file type or other criteria as set forth by policy).

Dedupe indices may map commonality using a variety of techniques. One such technique is to use Merkle trees. However, as conventional Merkle trees grow to index larger amounts of data, it becomes difficult to quickly determine whether a node in the tree is in use or not. Background processes usually need to periodically look at the entire Merkle tree structure to clean up unneeded data and nodes, which may be a slow and resource intensive process.

To alleviate this problem, the techniques described herein uses reference counts for each node in a Merkle tree to track when portions of the tree are no longer needed. When commonality is found, a node in the Merkle tree representing the highest point for the commonality is incremented. During object deletion, the reference count that is contained in the root node of the object is decremented. The root node of the object is the node that represents the highest point of data commonality mapped by the Merkle tree. If the decremented reference count reaches zero, then all of its child nodes are decremented. Node cleanup can now easily be done by simply looking for nodes with references equal to zero, decrementing the children nodes, and repeating the process if the children nodes are decremented to zero. This requires fewer resources than searching the entire Merkle tree for unneeded nodes, and lowers the frequency of garbage collections in the system. Further, the addition of location fields within the Merkle tree may be used to map an object to data location.

Figure 3:
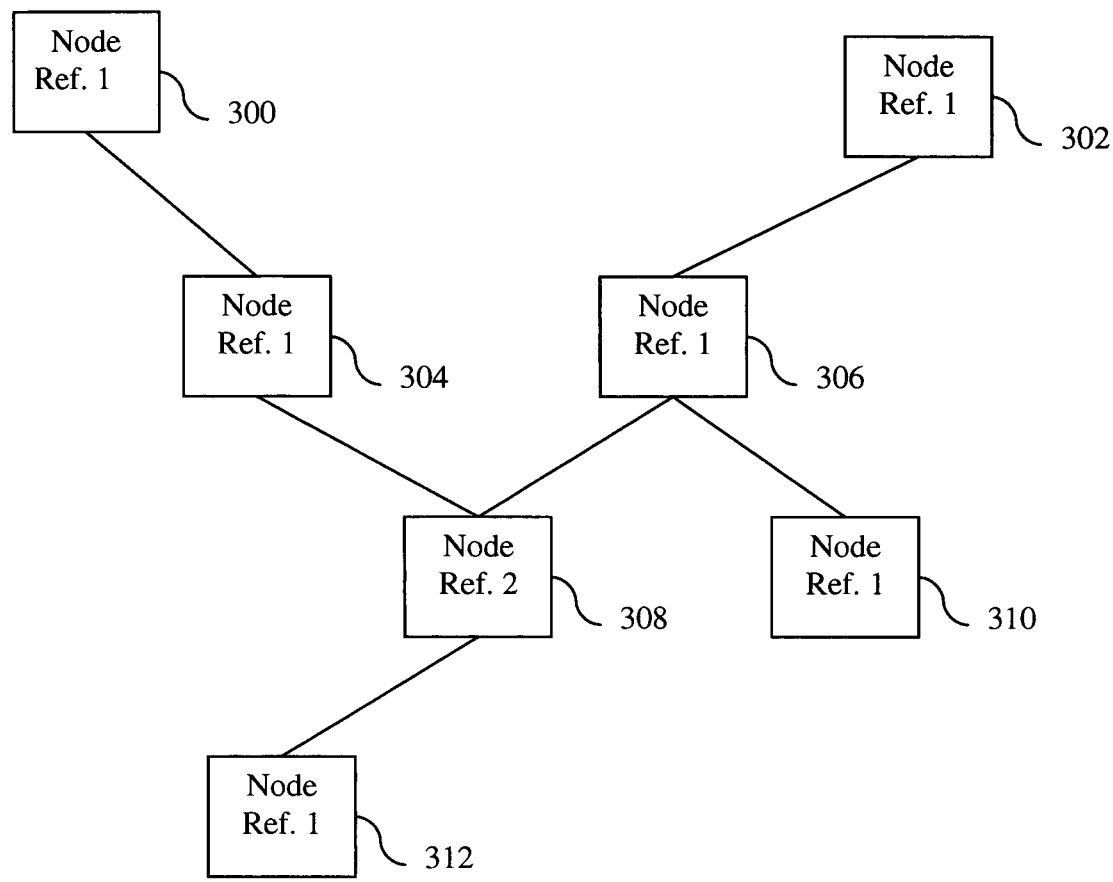
FIG. 3 is a diagram of a Merkle tree in some embodiments of the invention.

FIG. 3 illustrates a Merkle tree in accordance with the techniques described herein. If node 300 was decremented, its reference count would be reduced to 0. Having a zero reference count would result in node 300 being deleted. When node 300 is deleted, node 304's reference count would be decremented to 0. Again, having a zero reference count would result in node 304 being deleted. When node 304 is deleted, node 308's reference count would be decremented to 1. Since node 308's reference count is not 0, node 308 would not be deleted, and node 312 would remain unchanged. For node 308 to be deleted, nodes 300 and 302 need to be deleted.

Figure 6:
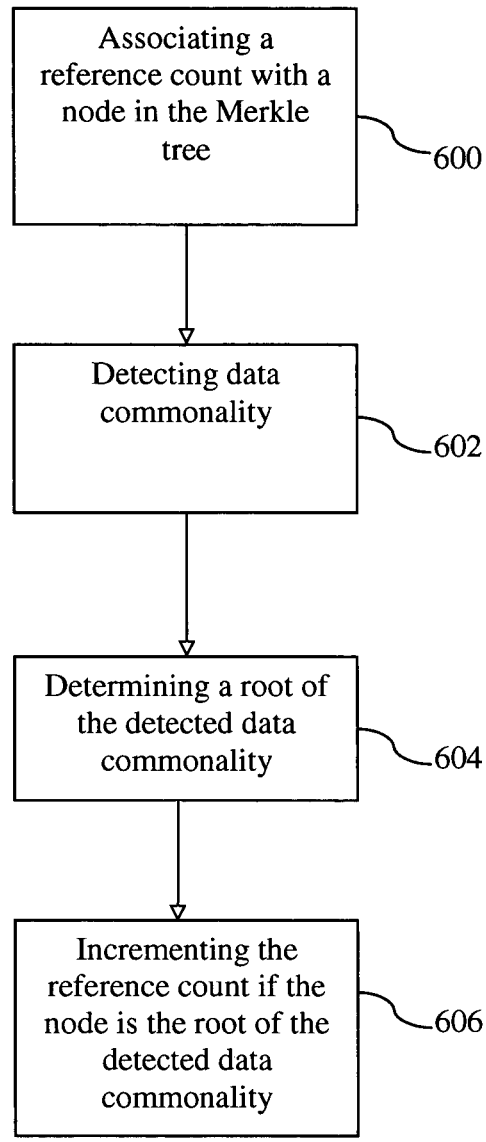
FIG. 6 illustrates a process to manage data commonality using a Merkle tree in accordance with some embodiments.

FIG. 6 illustrates a process to manage data commonality using a Merkle tree in accordance with the techniques described herein. In step 600, a reference count is associated with a node in the Merkle tree. In step 602, data commonality is detected. In step 604, a root of the detected data commonality is determined. In step 606, the reference count is incremented if the node is the root of the data commonality.

Figure 7:
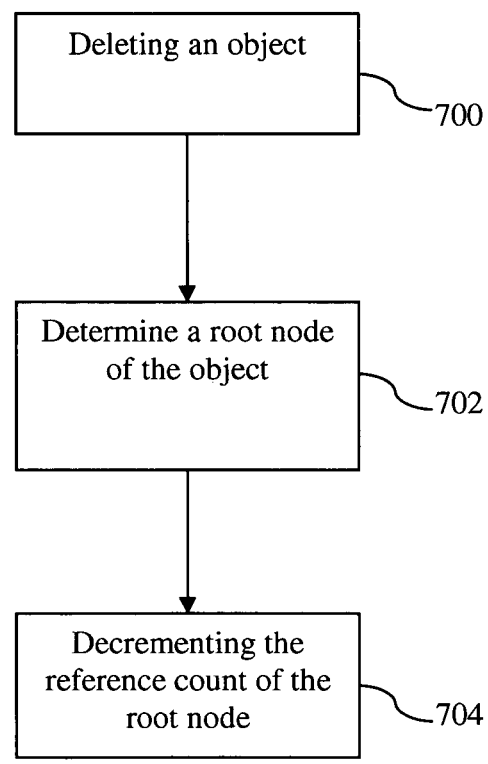
FIG. 7 illustrates a process to remove nodes in Merkle trees in accordance with some embodiments.

FIG. 7 illustrates a process to remove nodes in Merkle trees in accordance with the techniques described herein. In step 700, an object is deleted. In step 702, a root node of the object is determined. In step 704, the reference count of the root node is decremented.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for managing data commonality in a storage system using a Merkle tree having nodes with associated reference counts, comprising:
    deleting an object;
    determining the blocks of the object, wherein the blocks include deduplicated data blocks, wherein the deduplicated data blocks are deduplicated by applying a hash function to create signatures and the created signatures are stored in a hash index;
    determining a root node of the object based on the determined blocks, wherein the root node maps data commonality across multiple objects;
    decrementing the reference count of the root node, wherein decrementing the reference count of the root node includes decrementing the reference count of the root node to zero;
    removing the root node from the Merkle tree;
    decrementing the reference count of a child node of the removed root node; and
    removing the child node if the reference count of the decremented child node is zero; and
    decrementing the reference count of a child of the removed child node.

2. A system for managing data commonality in a storage system using a Merkle tree having nodes with associated reference counts, comprising a processor configured to:
    delete an object;
    determine the blocks of the object, wherein the blocks include deduplicated data blocks, wherein the deduplicated data blocks are deduplicated by applying a hash function to create signatures and the created signatures are stored in a hash index;
    determine a root node of the object based on the determined blocks, wherein the root node maps data commonality across multiple objects;
    decrement the reference count of the root node, wherein decrement the reference count of the root node includes decrementing the reference count of the root node to zero;
    remove the root node from the Merkle tree;
    decrement the reference count of a child node of the removed root node;
    remove the child node if the reference count of the decremented child node is zero; and
    decrementing the reference count of a child of the removed child node.

* * * * *